United States Patent [19]

Tan

[11] Patent Number: 5,529,607
[45] Date of Patent: Jun. 25, 1996

[54] PSA PROCESS WITH DYNAMIC PURGE CONTROL

[75] Inventor: Ziming Tan, Basking Ridge, N.J.

[73] Assignee: The BOC Group, Inc., New Providence, N.J.

[21] Appl. No.: 404,661

[22] Filed: Mar. 15, 1995

[51] Int. Cl.[6] ............................................. B01D 53/047
[52] U.S. Cl. ...................... 95/12; 95/100; 95/103; 95/105; 95/130; 95/138
[58] Field of Search ...................... 95/8, 11, 12, 95–105, 95/130, 138

[56] References Cited

U.S. PATENT DOCUMENTS

| | | | |
|---|---|---|---|
| 3,237,377 | 3/1966 | Skarstrom | 95/130 X |
| 3,485,013 | 12/1969 | McCarthy | 95/8 |
| 3,703,068 | 11/1972 | Wagner | 95/11 |
| 3,923,477 | 12/1975 | Armond et al. | 95/130 X |
| 4,197,095 | 4/1980 | White, Jr. et al. | 95/23 X |
| 4,299,595 | 11/1981 | Benkmann et al. | 95/98 X |
| 4,315,759 | 2/1982 | Benkmann | 95/23 |
| 4,472,177 | 9/1984 | Sircar | 95/11 |
| 4,539,019 | 9/1985 | Koch | 95/130 X |
| 4,631,073 | 12/1986 | Null et al. | 95/8 X |
| 4,693,730 | 9/1987 | Miller et al. | 95/8 |
| 4,983,190 | 1/1991 | Verrando et al. | 95/11 |
| 5,104,426 | 4/1992 | Yamada et al. | 95/11 |
| 5,152,813 | 10/1992 | Coe et al. | 95/130 X |
| 5,163,978 | 11/1992 | Leavitt et al. | 95/130 X |
| 5,174,979 | 12/1992 | Chao et al. | 95/130 X |
| 5,407,465 | 4/1995 | Schaub et al. | 95/130 X |

FOREIGN PATENT DOCUMENTS

| | | | |
|---|---|---|---|
| 0609620 | 8/1994 | European Pat. Off. | 95/98 |
| 3006836 | 9/1981 | Germany | 95/11 |
| 62-097622 | 5/1987 | Japan | 95/11 |
| 63-307101 | 12/1988 | Japan | 95/12 |
| 03-127604 | 5/1991 | Japan | 95/95 |

Primary Examiner—Robert Spitzer
Attorney, Agent, or Firm—Coleman R. Reap; Larry R. Cassett

[57] ABSTRACT

Oxygen of uniform purity is produced in a two-bed air-fed oxygen pressure swing adsorption process in which the beds are operated out of phase. The steps of the adsorption cycle include a pressurization/production step and a bed regeneration step, with the bed undergoing regeneration being purged with a low pressure stream of the oxygen-enriched gas produced as the nonadsorbed product of the process. The oxygen concentration in the purged gas effluent is continuously periodically monitored, and the maximum oxygen concentration in the effluent during selected purge steps is compared with the maximum oxygen concentration in the effluent during a previous purge step, and the difference is used to adjust the timing and duration of a purge step following the selected purge step in a manner that reduces the difference between the oxygen concentration in the sequential purge steps.

29 Claims, 2 Drawing Sheets

PSA PROCESS WITH DYNAMIC PURGE CONTROL

FIELD OF THE INVENTION

This invention relates to a multiple bed pressure swing adsorption (PSA) process which includes a purge period as part of its cycle, and more particularly to a method of controlling the cycle carried out in each bed of a multiple bed PSA system to minimize variation of the nonadsorbed gas composition produced by the process.

BACKGROUND OF THE INVENTION

PSA processes have been employed for many years to separate the components of a gas mixture. PSA processes are carried out in an elongate vessel which has a feed gas inlet end and a nonadsorbed gas outlet end and which is packed with an adsorbent which preferentially adsorbs one or more of the components of the gas mixture. The gas mixture is passed cocurrently (from feed gas inlet to nonadsorbed gas outlet) through the vessel, thereby removing the preferentially adsorbed component from the gas stream. A product gas enriched in the component or components that are not preferentially adsorbed passes through the adsorbent bed and exits the bed through the nonadsorbed gas outlet. The adsorbed component initially accumulates at the inlet end of the bed, and as the adsorption step proceeds, the adsorbed component forms a front which gradually moves toward the nonadsorbed outlet end of the bed. When the adsorbed gas front reaches a certain point in the bed the adsorption step is terminated and the adsorbent is regenerated by desorbing the adsorbed component from the bed. This is generally accomplished by countercurrently depressurizing the bed, and/or by countercurrently purging the bed with nonadsorbed component gas. When the bed is regenerated to the desired extent, the cycle is repeated.

A typical PSA cycle includes a pressurization step, in which the pressure in the adsorption vessel is raised to the pressure at which it is desired to conduct the adsorption step of the process, by introducing a gas (usually the gas mixture being separated) into the vessel; an adsorption or production step; and a bed regeneration step. The cycle may include other steps, such as multiple pressurization and depressurization steps.

In conventional PSA processes, the adsorption step is generally conducted at moderate to high pressures, e.g. pressures in the range of about 5 to about 20 bar, absolute (bara), and the bed regeneration step is frequently carried out at or below atmospheric pressure. These processes are generally efficient and result in the production of consistently high purity nonadsorbed gas product. Such processes are, however, energy intensive, since considerable energy must be expended to compress the feed gas to the adsorption step operating pressure.

Low pressure PSA processes with low adsorption pressure to regeneration pressure ratios have recently been developed. These processes are generally operated with adsorption pressures up to one to three bara and bed regeneration pressures of about atmospheric pressure. The feed gas can be easily pressurized to these pressures by means of low energy equipment, such as blowers, and since the bed is regenerated at atmospheric pressure there is no need to use high energy vacuum generating equipment. In such low pressure processes, it is common to use a portion of the nonadsorbed gas product produced in each cycle to purge the bed of adsorbed gas component in order to enhance process performance.

It is highly desirable that the variation of quality of product gas produced in the various beds of a multiple bed adsorption system processes be very low. However, when multiple bed adsorption systems are used for adsorption processes that are carried out at low adsorption pressure to vent pressure ratio operating conditions, e.g. 3 bara/atmospheric pressure, significant variations in product quality are experienced. This does not present a problem when the equipment is used for moderate or high pressure adsorption processes, since the variation of product quality diminishes with increasing adsorption pressures.

U.S. Pat. No. 4,472,177 discloses a vacuum swing adsorption process for producing oxygen and nitrogen from an air stream. According to the disclosure of this patent, nitrogen is adsorbed from air which is at near ambient pressure to produce oxygen as nonadsorbed product. After completion of the adsorption step of the process nitrogen is passed through the beds to rinse oxygen from the void spaces in the beds. The rinse step is terminated when low oxygen is detected in the purge gas effluent.

Copending U.S. patent application Ser. No. 08/189,008, filed Jan. 28, 1994, now U.S. Pat. No. 5,490,871, discloses a process for preventing excessive loss of purge gas in a PSA process by analyzing the purged waste gas stream from the process for purge gas, and terminating the purge step when the concentration of purge gas in the waste stream reaches a preselected volume of the waste gas stream.

Because of the attractiveness of low pressure adsorption processes, improvements that reduce product quality variation in multiple vessel systems are constantly sought. This invention presents an efficient and cost effective method of accomplishing this goal.

SUMMARY OF THE INVENTION

The invention comprises a cyclic PSA process for recovering a first gas component from a gas mixture containing the first gas component and a second gas component in a PSA system comprised of two or more beds of adsorbent which more strongly adsorbs the second gas component than the first gas component. The beds of the system are arranged in parallel and operated out of phase such that at least one bed is in adsorption service while at least one other bed is being regenerated. A partial cycle of the process of the invention comprises at least the following steps:

(a) flowing the gas mixture into one or more beds that have just completed bed regeneration, thereby pressurizing the bed(s) to a selected adsorption pressure, usually in the range of about atmospheric pressure to about 20 bara, and producing a nonadsorbed product enriched in the first gas component. At the same time, one or more of the other beds of the system undergo regeneration by causing a gas enriched in the second gas component to be desorbed from these beds at a selected vent pressure, which is lower than the adsorption pressure. During at least part of the bed regeneration period the beds being regenerated are purged with the nonadsorbed product. Step (a) is repeated with the roles of the beds in adsorption service and the beds undergoing regeneration being changed until all the beds of the system have undergone the partial cycle of steps (a) to (c), thus completing a full cycle. The full cycle described above is repeatedly carried out so that the process is a substantially continuous cycle.

(b) periodically determining the absolute difference between the concentration of first gas component in the waste gas stream from the bed(s) being regenerated at the time of occurrence of a specific event during bed regeneration of one or more beds and the concentration of first gas component in the gas stream exiting these beds at the time of occurrence of the specific event during an earlier regeneration of one or more other beds, and (c) periodically adjusting the duration of the purge period of one or both of the one or more beds and the one or more other beds in a manner that will reduce the absolute difference between the concentration of first gas component in the beds.

In one preferred embodiment the first component is oxygen and the second component is nitrogen, and in another preferred embodiment the first component is preferably nitrogen and the second component is preferably oxygen. In the most preferred embodiment the gas mixture being processed is air.

The specific event of the process may be the occurrence of an extreme concentration of first component in the gas stream exiting the bed(s) being regenerated or the passage of a specific period of time after initiation of the purge period. In a preferred embodiment, the specific event is the occurrence of an extreme concentration of first component in the gas stream exiting the beds being regenerated. In the most preferred embodiment, the specific event is the occurrence of a maximum concentration of first component in the gas stream exiting the bed(s) being regenerated.

The determination of absolute difference between the concentration of nonadsorbed gas component in the vent stream may be made during each bed regeneration step or during selected bed regeneration steps. Similarly, the adjustment of the duration of the purge period may be made in every bed regeneration period or in selected bed regeneration periods. Furthermore, the absolute difference determination may be made more frequently than the adjustment of the purge period. The periods of regeneration in which adjustment step (c) is put into effect can be separated by a fixed or variable number of periods of regeneration in which no adjustment of purge period is made. In a preferred embodiment, the purge period is adjusted only when the absolute difference determined in step (b) exceeds a selected value.

The determination of absolute difference in nonadsorbed gas in the vent stream is based on a comparison of measurements made when one bed is being regenerated and at an earlier time when another bed is being regenerated. The comparison may be based on measurements made during consecutive bed regeneration periods or on measurements made during nonconsecutive bed regeneration periods. Similarly, the purge period adjustment may be put into effect in the bed regeneration period immediately following the regeneration period in which absolute difference determination is made, or at some subsequent bed regeneration period.

The adjustment of the purge period may be made to one bed of the system, or it may be made to two or more beds. In a preferred embodiment, the adjustment is made to two beds, and in cases where more than two beds are sequentially operated, it is preferred to adjust the two most divergent beds, i.e. those in which the difference in concentration of nonadsorbed gas in the vent stream is greatest.

The process may have as an additional step prior to step (a), the step of partially depressurizing the bed(s) entering the regeneration period and partially pressurizing the bed(s) entering the adsorption step by flowing gas from the former beds to the latter beds (bed equalization). The process may also have as an additional step prior to step (a), the step of partially pressurizing the bed(s) entering the adsorption step by flowing first component-enriched gas into the bed(s) (product backfill), while at the same time, partially depressurizing the bed(s) entering the regenerating period by venting gas from these beds. Further, the process may have both of these steps, with the bed equalization step preceding the product backfill step, and the product backfill step preceding step (a).

The process of the invention is preferably carried out in a pair of twin beds, or in multiple pairs of twin beds.

When the gas being treated is air, the adsorbent is preferably a synthetic or natural zeolite. Preferred adsorbents for the separation of air are synthetic zeolites selected from type X and type A zeolites. The zeolite may have as exchangeable cations, ions selected from Group 1A, Group 2A, Group 3A, Group 3B, and the lanthanide series of the Periodic Table. Preferred zeolites are type X zeolites selected from lithium-exchanged type X zeolite, calcium-exchanged type X zeolite, lithium- and calcium- exchanged type X zeolite and combinations of these.

In the most preferred embodiment of the invention, the process is a PSA process for recovering oxygen-enriched gas from air in a system comprised of two beds of adsorbent which more strongly adsorb nitrogen than oxygen, the beds being arranged in parallel and operated out of phase such that one bed is in adsorption service while the other bed is being regenerated. The steps of this most preferred process include:

(a) passing air through the first bed at an adsorption pressure in the range of about atmospheric pressure to about 3 bar, absolute, thereby producing oxygen-enriched gas as a nonadsorbed product, while regenerating the second bed by desorbing nitrogen therefrom at a pressure lower than said adsorption pressure, the second bed being purged with oxygen-enriched gas during at least part of the regenerating period, and the concentration of oxygen in the stream exiting the second bed being monitored during at least part of the regenerating period;

(b) repeating steps (a) to (c) with the roles of the first and second beds being reversed.

(b) periodically determining the absolute difference between the maximum concentration of oxygen in the gas stream exiting the second bed during a given regenerating period with the maximum concentration of oxygen in the gas stream exiting the first bed during a preceding regenerating period, and (c) adjusting the duration of the purge in one or both beds during a subsequent bed regeneration period in a manner that will reduce the absolute difference between the maximum concentration of oxygen in the gas stream exiting the second bed during the current regenerating period and the maximum concentration of oxygen in the gas stream exiting the first bed in the next succeeding regenerating period.

BRIEF DESCRIPTION OF THE DRAWINGS

The invention will be more clearly understood by reference to the following description of exemplary embodiments thereof in conjunction with the accompanying drawings, in which.

Figure 1:
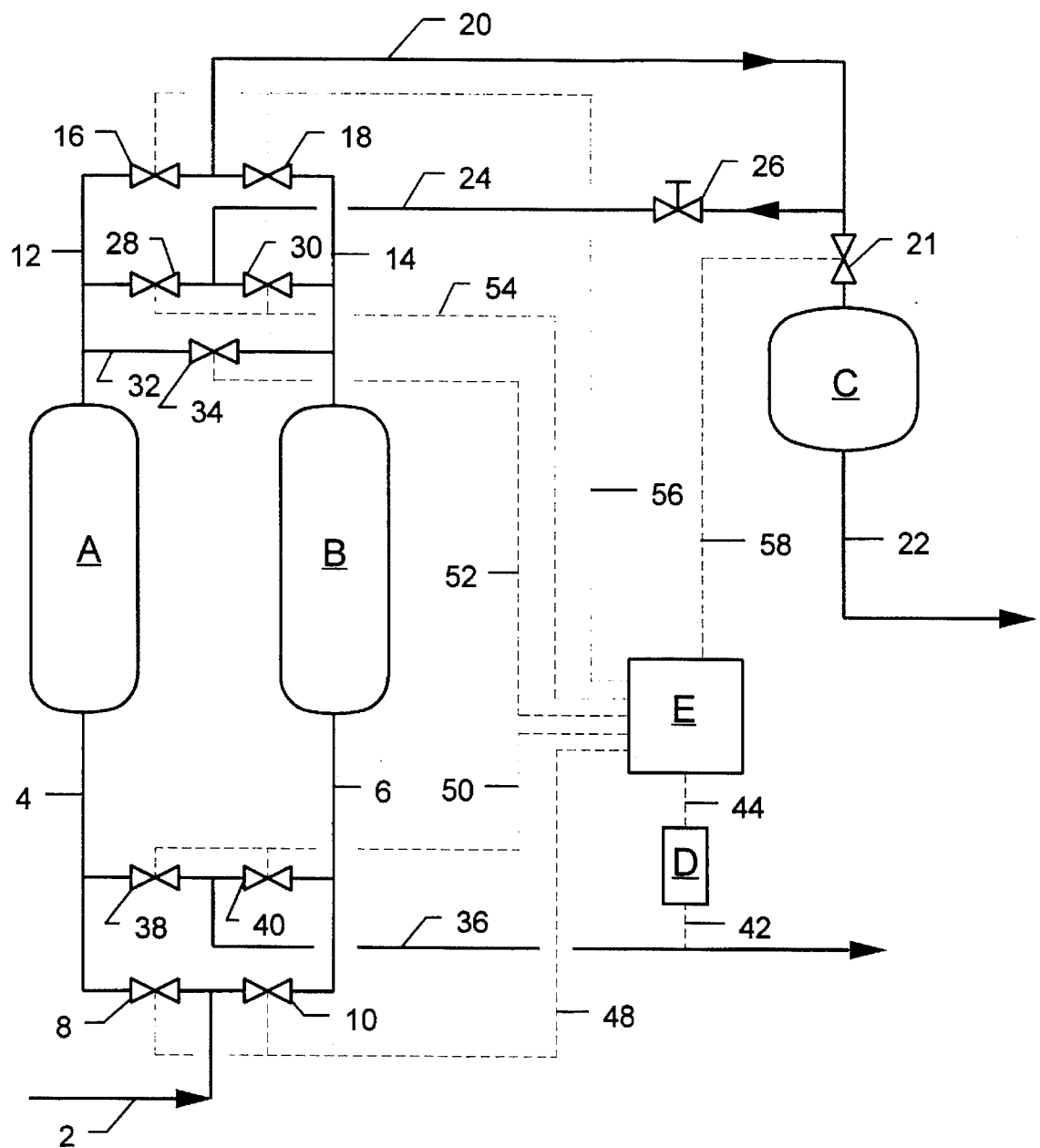
FIG. 1 is a diagrammatic view of one embodiment of a PSA system suitable for recovering a gas from a gas mixture by the process of the invention.

Only equipment, valves and lines necessary for an understanding of the invention have been included in the drawing figures.

DETAILED DESCRIPTION OF THE INVENTION

The invention may be practiced using any pressure swing adsorption system comprising two or more adsorbent-containing vessels arranged in parallel and operated out of phase. For example, the system may consist of a single pair of adsorption beds, multiple pairs of beds that alternate through various phases of an adsorption cycle, or three or more beds that are operated in sequence as a set. The system is operated in repeating cycles, a cycle being completed when each bed of the series passes once through each step of the adsorption cycle sequence. The term "partial cycle" is used herein to describe the part of a cycle in which one adsorption bed has sequenced through all of the steps of the process. When the process is carried out in two alternating beds, a partial cycle is a half-cycle, and when three beds are used in series in the process, a partial cycle is a one third-cycle. There is one bed regeneration period in a partial cycle.

The steps of the adsorption cycle include, as a minimum, a bed pressurization step, an adsorption or production step and a bed regeneration step. The pressurization step may be carried out in one or more stages, including one or more of a bed equalization step, in which cocurrent expansion gas from a bed that has just completed its adsorption step is countercurrently introduced into a bed that has just completed its bed regeneration step; as a second stage, a product backfill step, in which nonadsorbed product gas is countercurrently introduced into the bed being pressurized and a feed pressurization step, in which the gas mixture being processed is cocurrently introduced into the bed. Preferred cycles include, as a first pressurization stage, a bed equalization step, and as a final pressurization stage, a feed pressurization step. A product backfill pressurization step may be substituted for either the equalization step or the feed pressurization step, or it may be sandwiched between the bed equalization step and the feed pressurization step. In a similar manner, bed regeneration may be carried out using multiple depressurization steps, including the counterpart of the above-described bed equalization pressurization step, and a countercurrent depressurization or vent step.

A key step of the adsorption cycle, insofar as this invention is concerned, is the purge or rinse step. During this step nonadsorbed product gas obtained from the nonadsorbed product gas storage vessel, or from another bed that is in its pressurization or production step, is passed through the bed being regenerated at low pressure. This step may begin upon or after initiation of the feed pressurization step and may continue for part or all of the remainder of the bed regeneration step.

The process of the invention makes it possible to consistently produce a nonadsorbed gas product stream that is consistent in composition, while maintaining the amount of nonadsorbed gas that is lost during the purge period to a minimum. It accomplishes by sensing the concentration of nonadsorbed gas in the purge stream exiting the adsorption vessel at the time of occurrence of a particular event during a bed regeneration period. As mentioned above, the event may be the occurrence of an extreme concentration of nonadsorbed gas in the purge effluent during a bed regeneration period, i.e. the occurrence of a maximum concentration of nonadsorbed gas in the purge effluent or the occurrence of a minimum concentration of nonadsorbed gas, i.e. the occurrence of a maximum concentration of desorbed gas, in the purge effluent. The event may also be the passage of a specific period of time after the purge step occurs, or even the occurrence of a point of inflection of the curve representing the concentration of nonadsorbed gas in the purge effluent from a bed, plotted against time.

The preferred event is the occurrence of a maximum concentration of nonadsorbed gas in the purge effluent. Using this event produces the most rapid correction of disparity of nonadsorbed product purity occurring between or among the partial cycles of a PSA process.

The process of the invention can be used to separate any gas that is weakly adsorbed by an adsorbent from any other gas that is more strongly adsorbed by the adsorbent. Typical of the separations that can be effected by the process of the invention include oxygen-nitrogen separations, carbon dioxide-methane or carbon dioxide-nitrogen separations, hydrogen-argon separations and olefin-paraffin separations. The process is particularly suitable for the separation of nitrogen or oxygen from a nitrogen- and oxygen-containing gas, such as air, especially separations in which the adsorbent adsorbs nitrogen more strongly than oxygen.

Although the invention can be used in PSA processes in which the adsorption step is carried out at higher pressures, for example separations conducted at pressures up to about 20 bara or higher, it is most advantageously used in processes in which the pressure during the adsorption step does not exceed about 5 bara. In general, the invention is applied with beneficial results to PSA processes in which the adsorption is carried out at pressures in the range of just above atmospheric pressure to about 5 bara, and is most suitable for use in processes in which the adsorption pressure is in the range of about 1.25 to about 3 bara. Low pressure processes are preferred because the pressure of the feed gas to the system can be easily increased to the range at which it is desired to conduct the adsorption step by means of a low energy-consuming device, such as a blower. The bed regeneration step is carried out at pressure lower than the adsorption pressure, and although it can be carried out at pressures as low as 200 millibar, absolute or less, it is preferable to avoid vacuum pressures, and to conduct this step at about atmospheric pressure or above, to avoid the use of high energy-consuming vacuum generating equipment. The adsorption to regeneration pressure ratio of the process of the invention is generally in the range of about 1.1 to about 3 and is preferably in the range of about 1.2 to about 2.5, on an absolute pressure basis.

The temperature at which the adsorption step is carried out is not critical, and, in general, can vary from a temperature of about −50° C. to a temperature of about 100° C., or higher. The optimum adsorption temperature of the process will depend, inter alia, upon the particular adsorbent being used, the pressure at which the process is carried out and the specific gases being separated.

For convenience, the invention will be described in detail as it is applied to the separation of oxygen-enriched product gas using an adsorbent that preferentially adsorbs nitrogen relative to oxygen, in a two bed system, with the beds being operated 180° out of phase in alternating half-cycles, such that one bed is in adsorption service while the other bed is undergoing bed regeneration. It is to be understood, however, that such a system is only exemplary of systems suitable for practicing the process of the invention. A system suitable for practice of the invention is illustrated in FIG. 1. Referring now to FIG. 1, there is shown therein an adsorption system comprising parallel adsorption units A and B, each of which contains an adsorbent which selectively adsorbs nitrogen from air, oxygen-enriched product gas storage reservoir C, oxygen sensor D and programmable logic controller (PLC) E. Feed air is provided to adsorbers A and B through feed line 2. Line 2 joins feed lines 4 and 6, which, in turn are connected to the feed inlet of adsorption units A and B, respectively. Lines 4 and 6 are respectively fitted with valves 8 and 10, so that feed air can be alternately directed into adsorption units A and B. On their nonadsorbed product outlet ends, adsorption units A and B are joined to oxygen-enriched product gas discharge lines 12 and 14, respectively. Lines 12 and 14 are fitted with valves 16 and 18, respectively, which provide for the selective removal of oxygen-enriched product gas from either one of adsorption units A and B. Lines 12 and 14 connect to line 20 at a point between valves 16 and 18. Line 20, in turn, is connected to oxygen-enriched product gas reservoir C. Flow of oxygen-enriched gas through line 20 is controlled by valve 21. Oxygen-enriched product gas can be discharged from reservoir C to product storage or to an end use application, as desired, through line 22.

Oxygen-enriched product purge gas can be provided to adsorbers A and B via line 24, which can be placed in fluid communication with lines 12 and 14 through valves 28 and 30, respectively. Line 24 is provided with pressure reducing means 26 to reduce the pressure of the nonadsorbed product gas to the pressure at which the purge step is to be carried out.

The nonadsorbed product end of adsorbers A and B can be placed in fluid communication through adsorber pressure equalization line 32. Flow of gas through line 32 can be effected by opening valve 34.

The illustrated system is provided with adsorption unit vent line 36 so that desorbed nitrogen-enriched waste gas can be removed from adsorption units A and B. Vent line 36 communicates with lines 4 and 6, respectively, through valves 38 and 40.

Oxygen sensor D measures the oxygen concentration in waste gas line 36 via test line 42 either continuously or at selected times at a frequency of e.g. about 0.01 to about 5 seconds, and it transmits the collected analog information to PLC E via line 44. The concentration may be an instantaneous value or an averaged value. The sampling frequency and the number of samplings used in the averaging (if an average value is used) are so chosen to optimize both sensitivity and accuracy of the collected concentration information. PLC E analyzes the information received from oxygen sensor D and sends signals to the various valves of the system through lines connecting PLC E with the valves, thereby controlling the opening and closing of the valves. Signals sent through line 48 control the operation of valves 8 and 10; signals sent through line 50 control the operation of valves 38 and 40; a signal sent through line 52 controls the operation of valve 34; signals sent through line 54 control the operation of valves 28 and 30; signals sent through line 56 control the operation of valves 16 and 18; and a signal sent through line 58 controls the operation of valve 21.

In the process of the invention, PLC E makes a determination of the absolute difference in the concentration of nonadsorbed gas in the purge effluent by comparing the nonadsorbed gas concentration in the purge effluent from one bed of the system in a selected partial cycle with the nonadsorbed gas concentration in the purge effluent from another bed of the system in a partial cycle earlier than the selected partial cycle. The earlier partial cycle may be the partial cycle immediately preceding the selected partial cycle, or it may be a partial cycle prior to the partial cycle immediately preceding the selected partial cycle. In preferred embodiments of the invention, the determination is based on a comparison of the nonadsorbed gas concentration in the purge effluent in consecutive partial cycles. This method provides the most up-to-date information and is thus most reliable.

PLC E may be set to make adjustments to selected valves in any of several patterns. For example, it may be instructed to make adjustments to only purge valves 28 and 30, so that only the duration of the purge step is altered, or it may make adjustments of valves 8, 10, 16, 18, 28 and 30 to alter both the duration of the production step and that of the purge step in a given partial cycle. When simultaneous adjustments are to be made to more than one bed of a system comprising three or more beds sequenced through partial cycles in serial order, it is preferred to adjust those beds whose concentrations of nonadsorbed gas are most divergent from the average concentration of nonadsorbed gas in the purge effluent from the beds during the regeneration steps of the cycle. Other adjustment combinations may be employed if desired.

The adjustments may be made in a particular sequence of partial cycles or at random. For example, valve adjustments may be made in each partial cycle that follows a concentration difference determination, or in every second partial cycle, or in every third partial cycle, etc after a concentration difference determination is made. The adjustments may be made in evenly spaced partial cycles, i.e. adjustments may be made in partial cycles that are separated by a fixed number of partial cycles in which no adjustment is made; or in variably spaced partial cycles, i.e., adjustments are made in partial cycles that are separated by a variable number of cycles in which no adjustment is made. In either case there are preferably 0 to about 5 partial cycles in which no adjustment is made separating those partial cycles in which an adjustment is made.

The PLC E may be set to make an adjustment of the purge duration of a bed or adjustments of various steps of the PSA process only when the disparity between the nonadsorbed gas concentration in the purge gas effluent from different beds of the system exceeds a selected value. This method of correcting nonadsorbed gas purity inconsistency is often preferable to other methods since it may result in fewer corrections and less chance of overcorrection.

The following table shows one of the many adsorption cycles in which the invention can be beneficially used. Each step of the cycle is described in detail as it applies to the production of oxygen-enriched gas from air in the apparatus illustrated in FIG. 1.

TABLE I

| Step | Adsorber A | Adsorber B |
|---|---|---|
| 1 | Equalization | Equalization |
| 2 | Feed Pressurization | Vent Depressurization |
| 3 | Feed Pressurization | Purge/Vent |
| 4 | Production | Purge/Vent |
| 5 | Production | Vent |
| 6 | Equalization | Equalization |

TABLE I-continued

| Step | Adsorber A | Adsorber B |
|---|---|---|
| 7 | Vent Depressurization | Feed Pressurization |
| 8 | Purge/Vent | Feed Pressurization |
| 9 | Purge/Vent | Production |
| 10 | Vent | Production |

At the beginning of step 1, adsorber A in FIG. 1 has just completed the regeneration phase and adsorber B has just completed the production phase of the cycle; thus, the pressure in adsorber A is at the lowest point and the pressure in adsorber B is at the highest point of the pressure cycle. During step 1, valve 34 is open and all other valves of the system are closed. Depressurization gas flows cocurrently out of adsorber B, through line 32 and countercurrently into adsorber A, thereby partially pressurizing adsorber A. The purpose of this step is to conserve some of the pressure energy that is stored in the adsorber that has just completed production and to recover some of the relatively oxygen-rich void space gas contained in adsorber B prior to regenerating this adsorber. Although this step is designated as an equalization step, it is not necessary that the step be continued until complete equalization between adsorbers A and B is effected.

Upon completion of step 1, valve 34 is closed and valves 8 and 40 are opened. Step 2, the feed pressurization/vent pressurization step, begins and adsorber A now undergoes further partial pressurization by the cocurrent flow of fresh feed through line 2, valve 8 and line 4 and into adsorber A. Simultaneously, nitrogen-rich gas is countercurrently desorbed from the adsorbent in vessel B by allowing the gas to vent through line 6, valve 40 and line 36.

Upon completion of step 2, valves 8 and 40 remain open, valves 16 and 30 are opened and pressure controller 26 adjusts the pressure of oxygen-enriched gas flowing through line 24 to the desired purge pressure, and step 3 begins. All other valves remain closed during step 3. During this step, pressurization of adsorber A continues with fresh feed until the pressure in adsorber A reaches the desired adsorption pressure. Meanwhile, countercurrent purging of adsorber B begins with the flow of oxygen-enriched gas through line 12, valve 16, lines 20 and 24, valve 30, line 14 and into adsorber B at purge pressure. The purge gas passes through vessel B and exits the system through line 6, valve 40 and line 36, carrying with it nitrogen-enriched gas that has been desorbed from the adsorbent contained in adsorber B.

Upon pressurization of adsorber A to the desired adsorption pressure, step 3 ends and step 4 begins. During step 4, valves 8, 16, 30 and 40 remain open and valve 21 is opened. All other valves remain closed. Oxygen-enriched product gas is now produced in adsorber A and transferred to vessel C through line 12, valve 16, line 20 and valve 21. Meanwhile, vessel B continues to be purged by the passage of low pressure oxygen-enriched product gas into vessel B via line 24, valve 30 and line 14, and out of vessel B and into the atmosphere through line 6, valve 40 and line 36.

Upon purging of vessel B to the desired extent, step 4 is terminated. At this point valve 30 is closed and valves 8, 16, 21 and 40 remain open. Flow of purge gas through adsorber B is stopped, but adsorber B continues to vent through open valve 40 and line 36. Meanwhile, feed air continues to enter adsorber A and oxygen-enriched product gas continues to flow out of adsorber A to vessel C. As the feed air passes through adsorber A, the adsorbed nitrogen gas front moves forward in vessel A and approaches the nonadsorbed product outlet of this vessel. When the front reaches a certain point in adsorber A, step 5 is terminated by the closing of valves 8, 16, 21 and 40. The termination point is optimally near the nonadsorbed product gas outlet of the adsorber, so that the adsorption system can be operated with maximum efficiency. Substantial breakthrough of nitrogen from adsorber A is avoided to prevent reduction of the purity of the oxygen-enriched product gas to below the acceptable minimum level. At the conclusion of step 5, the first half of the cycle of the process of the invention is completed.

The second half of the cycle is carried out by reversing the functions conducted in adsorbers A and B during steps 1–5, by manipulation of valves corresponding to the valves operated during the respective preceding steps. Thus, during step 6, only valve 32 is open and equalization gas flows from adsorber A to adsorber B; during step 7, only valves 10 and 38 are open, and fresh feed flows into adsorber B through lines 2 and 6 while adsorber A undergoes countercurrent vent depressurization; during step 8, only valves 10, 18, 28 and 38 are open, and adsorber B is pressurized to operating pressure with fresh feed gas while adsorber A undergoes purge and venting; during step 9, only valves 10, 18, 21, 28, and 38 are open and adsorber B continues to produce oxygen-enriched gas and adsorber A continues to undergo purging and venting; and during step 10 only valves 10, 18, 21 and 38 are open, and adsorber B continues to produce oxygen-enriched gas while under adsorber A undergoes final venting. At the conclusion of step 10 the current cycle is completed and the next cycle begins with adsorber A in adsorption service and adsorber B undergoing regeneration.

The above cycle is a typical operating cycle which makes possible the production of a relatively high purity, e.g. as high as 93% by volume pure or higher, oxygen-enriched product stream. As a variation of this process, the cycle can be modified by eliminating the equalization steps (steps 1 and 6) and/or by adding product backfill steps. In these variations the pressurization formerly provided by the equalization steps can be provided by the product backfill steps and/or the feed pressurization steps. Furthermore, the purge gas for the purge/vent operations of all of steps 3 and 8 can be provided from vessel C, if desired.

The key feature of the invention is the measurement of the oxygen concentration in the waste gas passing through line 36 during the purge/vent and final vent steps of each partial cycle. This measurement is preferably made continuously during these steps, although this is not strictly necessary, the important thing being the measurement of the oxygen concentration in the waste gas during the happening of a specific event. This event may be the occurrence of an extreme oxygen concentration in the gas stream, which, for purposes of this invention, is defined as the maximum oxygen concentration or a minimum oxygen concentration occurring during the period that includes both the purge/vent and the final vent steps of a partial cycle. The event may also be the passage of a specific period of time after initiation of the purge step of the partial cycle. For purposes of this invention the term "event" is used to denote the occurrence of a maximum oxygen concentration in the waste gas stream during a partial cycle, the occurrence of a minimum oxygen concentration in the waste gas stream during a partial cycle or the passage of a specific period of time after initiation of the purge sequence of a partial cycle.

The oxygen concentration measurement made at the exact time of the occurrence of the event during a partial cycle is transmitted to PLC E. PLC E compares the value of the measurement made during the current partial cycle with the value of the corresponding measurement made during the partial cycle immediately preceding the current cycle. PLC E then adjusts the total duration of the purge step of the partial cycle immediately succeeding the current partial cycle in the direction that will tend to reduce the difference between the critical measurement of the current partial cycle and that of the immediately preceding partial cycle. The adjustment may entail advancing or retarding the starting time and/or the ending time of the purge sequence of the partial cycle immediately following the current partial cycle. This process is repeated for each partial cycle of the process, thus resulting in a dynamically controlled adsorption process.

The preferred event is the occurrence of an extreme value of oxygen concentration, and the most preferred event is the occurrence of the maximum oxygen concentration during the purge and vent steps of a partial cycle. Use of the maximum value provides the most rapid reduction of oxygen concentration differences between successive partial cycles.

It can be appreciated that modification of the duration of the purge sequence of a partial cycle entails modification of one or more of the other steps of a partial cycle and/or the duration of the partial cycle. For example, increasing the duration of the purge sequence of a partial cycle will require shortening the extent of the vent step preceding the purge sequence and/or the vent step following the purge sequence and/or increasing the duration of the entire partial cycle. In preferred embodiments it is preferred to adjust the duration of the vent steps and keep the total partial cycle time constant.

The adsorption cycle may contain steps other than the fundamental steps of adsorption and regeneration. For example, it may be advantageous to depressurize the adsorption bed in multiple steps, with the first depressurization product being used to partially pressurize one bed and the second depressurization product being used to partially pressurize another bed in the adsorption system.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

This experiment was carried out in a two-bed laboratory-scale PSA system similar to the system illustrated in FIG. 1, using atmospheric air as feed. The adsorbent used in the beds was UOP PSA $O_2$ HP 13X zeolite, sold by UOP. The entire PSA system was enclosed in a controlled environment chamber maintained at a constant temperature of 20° C. (the feed gas temperature). The operating cycle was the similar to the cycle set forth in Table I. The duration of the cycle was 120 seconds, distributed as follows: steps 1 and 6—5 secs; steps 2 and 7—6 secs; steps 3 and 8—24 secs; steps 4 and 9, 25 secs, and steps 5 and 10—0 secs (i.e. steps 5 and 10 were eliminated). The production steps were carried out at adsorption pressure of 0.5 bar, gauge (barg) and the vent pressure was atmospheric pressure (0 barg).

Figure 2:
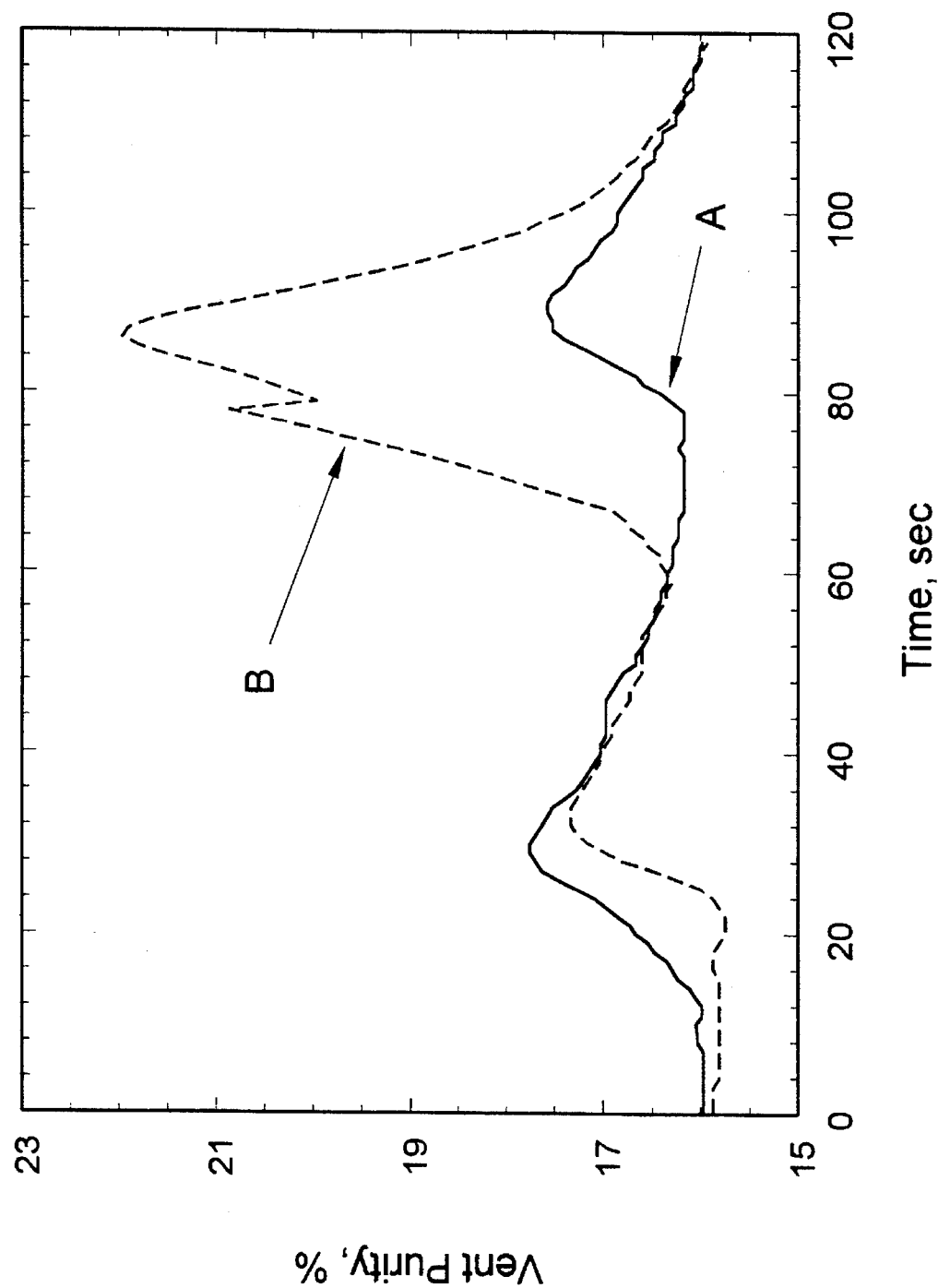
FIGS. 2 is a graph showing a comparison of the variation of the concentration of oxygen in the vent stream over one cycle of the PSA process of the invention and the variation of the concentration of oxygen in the vent stream over one cycle of a conventional PSA process.

During the course of the experiment, the duration of steps 2, 3, 7 and 8 were adjusted automatically in response to readings made by a PLC. An oxygen sensor measured the oxygen concentration in the vent gas during the purge/vent steps. Comparisons of the maximum oxygen concentrations in the vent stream in consecutive half-cycles were made, and the durations of the above-mentioned steps were adjusted in the direction that would reduce the difference oxygen concentration maximum in the purge/vent steps of the next half-cycle. Steady state conditions were attained. The steady state results are tabulated in Table II. A profile of the oxygen concentration in the vent stream during a single cycle of the test run is illustrated in FIG. 2 as curve A.

TABLE II

| Oxygen Purity, % | 92.1 |
| Specific Product, $Nm^3/m^3$ | 4.9 |
| Oxygen Yield, % | 22.6 |

EXAMPLE II

The Procedure of Example I was repeated except that no attempt was made to adjust differences in the maximum oxygen concentration occurring during purge/vent steps. Steady state conditions could not be established, and the purity of the oxygen product gas fluctuated between 60% and 90% during the test period. A profile of the oxygen concentration in the vent stream during a single cycle is illustrated in FIG. 2 as curve B.

FIG. 2 illustrates the benefit attained by use of the invention in a low pressure PSA process. As shown in FIG. 2, the variation of oxygen concentration in the vent stream from the system was much less when the procedure of the invention was used (curve A) compared with the oxygen concentration variation in the vent stream when the procedure of the invention was not used.

Although the invention has been described with particular reference to specific adsorption cycles, and to specific experiments, these features are merely exemplary of the invention and variations are contemplated. For example, the adsorption cycle may include more than two bed equalization steps, and the invention can be used in PSA processes used to separate gases other than oxygen and nitrogen. Furthermore, the duration of the individual steps and the operating conditions may be varied. The scope of the invention is limited only by the breadth of the appended claims.

What is claimed is:

1. A cyclic PSA process for recovering first component-enriched gas from a gas mixture containing first and second components in a system comprised of a battery of two or more beds of adsorbent which more strongly adsorb the second component than the first component, said beds being arranged in parallel and operated out of phase such that at least one bed is in adsorption service while at least one other bed is being regenerated, wherein a specific event occurs during each period of bed regeneration, comprising the following steps:

(a) flowing said gas mixture into said at least one bed, thereby pressurizing said at least one bed to a selected adsorption pressure and producing first component-enriched gas as a nonadsorbed product, while regenerating said at least one other bed by desorbing second component-enriched gas therefrom at a selected vent pressure, said at least one other bed being purged with first component-enriched gas during at least part of the period of regeneration of said at least one other bed;

(b) repeating step (a) with the roles of said at least one bed and said at least one other bed being changed until all beds of said system have undergone step (a);

(c) periodically determining the absolute difference between the concentration of first component in the second component-enriched gas being desorbed from said at least one other bed upon the occurrence of said specific event during a period of regeneration of said at least one other bed and the concentration of first component in the second component-enriched gas being desorbed from said at least one bed upon the occurrence of said specific event during a period of regeneration of said at least one bed, and (d) periodically adjusting the duration of purge in one or more of said at least one bed and said at least one other bed in a manner that will reduce said absolute difference.

2. The process of claim 1, wherein said battery comprises one or more pairs of alternately operated beds of adsorbent.

3. The process of claim 1 or 2, wherein said specific event is the occurrence of an extreme concentration of first component in the second component-enriched gas being desorbed from a bed being regenerated or the passage of a specific period of time after initiating purge of a bed being regenerated.

4. The process of claim 3, wherein said specific event is the occurrence of an extreme concentration of first component in the second component-enriched gas being desorbed from a bed being regenerated.

5. The process of claim 4, wherein said occurrence of an extreme concentration of first component is the occurrence of a maximum concentration of first component in the second component-enriched gas being desorbed from a bed being regenerated.

6. The process of claim 1 or claim 2, wherein the periods of regeneration in which step (c) is conducted are separated by a fixed number of periods of regeneration in which step (c) is not conducted.

7. The process of claim 6, wherein said fixed number of periods is in the range of 0 to about 5.

8. The process of claim 1 or claim 2, wherein step (c) is conducted more frequently than step (d).

9. The process of claim 1 or claim 2, wherein step (d) is conducted only when the absolute difference determined in step (c) exceeds a selected value.

10. The process of claim 1 or claim 2, wherein the periods of regeneration in which step (c) is conducted are separated by a variable number of periods of regeneration in which step (c) is not conducted.

11. The process of claim 10, wherein said variable number of periods is in the range of about 1 to about 5.

12. The process of claim 1 or claim 2, wherein said period of regeneration of said at least one bed which precedes said selected period of regeneration of said one other bed and said selected period of regeneration of said one other bed are consecutive bed regeneration periods.

13. The process of claim 12, wherein said selected period of regeneration of said at least one other bed and the period of regeneration in which the adjustment of step (d) is implemented are consecutive bed regeneration periods.

14. The process of claim 13, wherein said gas mixture is air.

15. The process of claim 14, wherein said adsorbent is selected from synthetic and natural zeolites.

16. The process of claim 15, wherein said adsorbent is a synthetic zeolite selected from type X zeolite and type A zeolite.

17. The process of claim 16, wherein said zeolite has exchangeable cations selected from ions of Group 1A, Group 2A, Group 3A, Group 3B, the lanthanide series and mixtures of these.

18. The process of claim 16, wherein said zeolite is type X zeolite selected from lithium-exchanged type X zeolite, calcium-exchanged type X zeolite, lithium- and calcium-exchanged type X zeolite and combinations of these.

19. The process of claim 16, wherein said adsorbent is selected from zeolite 5A, zeolite 10X, zeolite 13X and mixtures of these.

20. The process of claim 1 or claim 2, wherein said selected period of regeneration of said at least one other bed and the period of regeneration in which the adjustment of step (d) is implemented are consecutive bed regeneration periods.

21. The process of claim 1 or claim 2, wherein said selected adsorption pressure is in the range of about atmospheric pressure to about 20 bara.

22. The process of claim 1 or claim 2, wherein said first component is oxygen and said second component is nitrogen.

23. The process of claim 22, wherein said selected adsorption pressure is in the range of about atmospheric pressure to about 3 bara.

24. The process of claim 1 or claim 2, wherein said first component is nitrogen and said second component is oxygen.

25. The process of claim 1 or claim 2, wherein prior to step (a) said at least one bed is partially pressurized and said at least one other bed is partially depressurized by flowing gas from said at least one other bed to said at least one bed.

26. The process of claim 25, wherein between the additional step of claim 25 and step (a) said at least one bed is further pressurized by flowing part of said nonadsorbed product thereinto while said at least one other bed is further depressurized by venting gas therefrom.

27. The process of claim 1 or claim 2, wherein prior to step (a) said at least one bed is partially pressurized by flowing part of said nonadsorbed product thereinto while said at least one other bed is partially depressurized by venting gas therefrom.

28. The process of claim 1 or claim 2, wherein said battery comprises at least three beds of adsorbent that are operated sequentially in a cycle, and steps (c) and (d) are conducted recurrently with each bed periodically playing the role of said one bed and periodically playing the role of said one other bed.

29. The process of claim 1 or claim 2, wherein the production portion of step (a) is carried out at a temperature in the range of about 0° to about 100° C.

* * * * *